United States Patent
Tsai et al.

(10) Patent No.: US 11,767,634 B2
(45) Date of Patent: Sep. 26, 2023

(54) SPRAYABLE AND HYGROSCOPIC INK FOR DIGITAL PRINTING PROCESS ON FABRIC AND HYGROSCOPIC FABRIC

(71) Applicant: TAIWAN TEXTILE RESEARCH INSTITUTE, New Taipei (TW)

(72) Inventors: Jung-Yu Tsai, New Taipei (TW); Chia-Yi Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 287 days.

(21) Appl. No.: 17/078,354

(22) Filed: Oct. 23, 2020

(65) Prior Publication Data

US 2021/0164156 A1 Jun. 3, 2021

(30) Foreign Application Priority Data

Dec. 3, 2019 (CN) .......................... 201911221639.1

(51) Int. Cl.
 *C09D 11/00* (2014.01)
 *D06N 3/12* (2006.01)
 *C09D 11/104* (2014.01)
 *C09D 11/037* (2014.01)

(52) U.S. Cl.
 CPC .......... *D06N 3/123* (2013.01); *C09D 11/037* (2013.01); *C09D 11/104* (2013.01); *D06N 2201/02* (2013.01); *D06N 2203/061* (2013.01); *D06N 2209/12* (2013.01); *D06N 2211/10* (2013.01)

(58) Field of Classification Search
 CPC .............. D06N 3/123; D06N 2201/02; D06N 2203/061; D06N 2209/12; D06N 2211/10; C09D 11/037; C09D 11/104; C09D 11/00

USPC ..................... 106/31.041, 31.13, 31.6, 31.01
See application file for complete search history.

(56) References Cited

U.S. PATENT DOCUMENTS

| | | | |
|---|---|---|---|
| 7,931,827 B2 | 4/2011 | Schneider et al. | |
| 10,400,136 B2 | 9/2019 | Dustin et al. | |
| 10,640,667 B1 | 5/2020 | Lin et al. | |
| 2003/0089271 A1 | 5/2003 | Hirano et al. | |
| 2006/0079602 A1 | 4/2006 | Johnson et al. | |
| 2008/0152956 A1* | 6/2008 | Murayama | G11B 5/733 |
| 2009/0298368 A1 | 12/2009 | Craamer et al. | |
| 2014/0267497 A1* | 9/2014 | Takagi | B41J 2/14233 347/45 |

FOREIGN PATENT DOCUMENTS

| | | |
|---|---|---|
| CN | 101070678 A | 11/2007 |
| CN | 101163758 A | 4/2008 |
| CN | 108086013 A | 5/2015 |
| CN | 106283757 A | 1/2017 |
| CN | 108193518 A | 6/2018 |
| CN | 108841247 A | 11/2018 |

(Continued)

*Primary Examiner* — James E McDonough
(74) *Attorney, Agent, or Firm* — McClure, Qualey & Rodack, LLP

(57) ABSTRACT

A sprayable and hygroscopic ink for a digital printing process on a fabric includes 3.0 parts by weight to 6.0 parts by weight of a colorant, 0.5 parts by weight to 2.0 parts by weight of a hygroscopic agent, 0.5 parts by weight to 1.0 part by weight of a surfactant, and a balance of a solvent, in which a pH value of the hygroscopic agent is between 6.0 and 8.5 at 25° C., and a particle diameter D90 of the sprayable and hygroscopic ink is between 180 nm and 220 nm.

10 Claims, 2 Drawing Sheets

(56) References Cited

FOREIGN PATENT DOCUMENTS

| | | | |
|---|---|---|---|
| CN | 109627848 | A | 4/2019 |
| EP | 3564439 | A1 | 11/2019 |
| JP | H1121772 | A | 1/1999 |
| JP | 2015218191 | A | 12/2015 |
| TW | 200628566 | A | 8/2006 |
| TW | 200641201 | A | 12/2006 |
| TW | I677611 | B | 11/2019 |
| TW | 202024430 | A | 7/2020 |

* cited by examiner

SPRAYABLE AND HYGROSCOPIC INK FOR DIGITAL PRINTING PROCESS ON FABRIC AND HYGROSCOPIC FABRIC

RELATED APPLICATION

This application claims priority to China Application Serial Number 201911221639.1, filed Dec. 3, 2019, which is herein incorporated by reference.

BACKGROUND

Field of Invention

The present disclosure relates to a sprayable and hygroscopic ink, and particularly relates to a sprayable and hygroscopic ink for a digital printing process, and also relates to a hygroscopic fabric sprayed with the sprayable and hygroscopic ink.

Description of Related Art

In recent years, people's awareness of family leisure and health has gradually increased, and hence the consumers' demand for functional fabrics has also increased. One of the functional fabrics popular among consumers is a hygroscopic fabric, which not only can quickly absorb sweat, but also has air permeability, so as to keep the human body dry. Therefore, how to perform the hygroscopic process on fabrics is one of the most important developments of post-treatment in recent years.

However, a traditional treatment for hygroscopic fabric is often achieved by a secondary processing including a dyeing process and a finishing process. Due to the limitation of the secondary processing, the color of the fabric is susceptible to migrate due to the influence of the finishing process, and problems such as low utilization rate of agent, low color yield, unstable fabric quality, and so on easily occur.

SUMMARY

An aspect of the present disclosure relates to a sprayable and hygroscopic ink.

According to some embodiments of the present disclosure, the sprayable and hygroscopic ink for a digital printing process on a fabric includes 3.0 parts by weight to 6.0 parts by weight of a colorant, 0.5 parts by weight to 2.0 parts by weight of a hygroscopic agent, 0.5 parts by weight to 1.0 part by weight of a surfactant, and a balance of a solvent, in which a pH value of the hygroscopic agent is between 6.0 and 8.5 at 25° C., and a particle diameter (D90) of the sprayable and hygroscopic ink is between 180 nm and 220 nm.

In some embodiments of the present disclosure, the hygroscopic agent comprises a polyetherester, and a weight-average molecular weight of the polyetherester is between 3000 and 20000.

In some embodiments of the present disclosure, a particle diameter (D90) of the hygroscopic agent is between 235 nm and 285 nm.

In some embodiments of the present disclosure, a particle diameter (D90) of the colorant is between 195 nm and 255 nm.

In some embodiments of the present disclosure, a viscosity of the sprayable and hygroscopic ink is between 1.9 cP and 10.0 cP.

In some embodiments of the present disclosure, a surface tension of the sprayable and hygroscopic ink is between 20 mN/m and 37 mN/m.

In some embodiments of the present disclosure, the sprayable and hygroscopic ink further includes 1.0 part by weight to 8.0 parts by weight of a thickening agent, and the thickening agent includes a sodium alginate, a nitrogen-containing heterocyclic ring, a carboxymethyl cellulose (CMC), or combinations thereof.

In some embodiments of the present disclosure, the sprayable and hygroscopic ink further includes 2.0 parts by weight to 3.0 parts by weight of a dispersant, and the dispersant includes a naphthalenesulfonic acid formaldehyde condensate, a lignin sulfonate, a phenol-formaldehyde condensate sulfonate, or combinations thereof.

In some embodiments of the present disclosure, the sprayable and hygroscopic ink further includes a moisturizer, a defoamer, a pH regulator, or combinations thereof.

Another aspect of the present disclosure relates to a hygroscopic fabric.

According to some embodiments of the present disclosure, the hygroscopic fabric includes a polyester base cloth and a functional coating layer. The polyester base cloth has a first surface and a second surface facing away from the first surface. The functional coating layer is obtained by spraying the aforementioned sprayable and hygroscopic ink onto the first surface of the polyester base cloth, in which the colorant of the sprayable and hygroscopic ink infiltrates into the polyester base cloth, and the hygroscopic agent of the sprayable and hygroscopic ink is disposed on the first surface of the polyester base cloth.

According to the aforementioned embodiments of the present disclosure, by adjusting each of the ingredients in the sprayable and hygroscopic ink, the sprayable and hygroscopic ink can provide a fabric with a color and a hygroscopic property, and the sprayable and hygroscopic ink can be sprayed onto the polyester base cloth through the digital printing process to form the hygroscopic fabric with color patterns. Since the colorant and the hygroscopic agent in the sprayable and hygroscopic ink are respectively arranged on different positions of the hygroscopic fabric, there will be no positional competition between the colorant and the hygroscopic agent, such that the hygroscopic fabric can have a relatively stable quality. In addition, the digital printing process can provide the fabric with partial or overall color and function in a single processing, thereby effectively solving the problem of color fastness reduction caused by the migration of colorants during a traditional secondary processing, and avoiding the excessive use of chemical agents to further reduce waste and effectively reduce costs.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
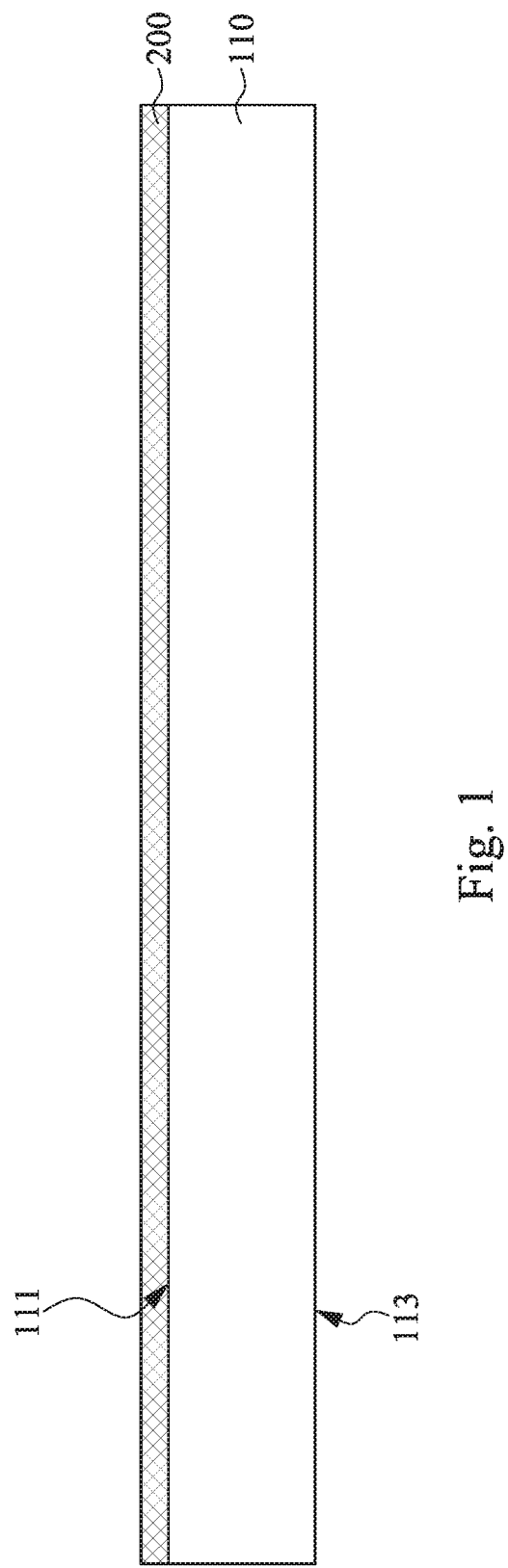
FIG. 1 is a schematic side view illustrating a polyester base cloth being sprayed by a sprayable and hygroscopic ink according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides a sprayable and hygroscopic ink and a hygroscopic fabric. The sprayable and hygroscopic ink can be sprayed onto the fabric through a digital printing process, such that the fabric has partial or overall color and hygroscopic property, thereby forming the hygroscopic fabric with color patterns. In other words, by spraying the sprayable and hygroscopic ink onto the fabric through the digital printing process, the hygroscopic fabric with both aesthetic and functionality can be formed. The digital printing process is a discontinuous phase coating method, in which the nozzle of the inkjet device will not be in contact with the fabric to be processed. The digital printing process has advantages of precise positioning, high usage rate of chemical agents, reduction of waste discharge, low energy consumption of processing, effective cost reduction, rapid sampling for small batches, and so on. Fabric finishing plants, fabric coating plants, and fabric surface processing industries can utilize the sprayable and hygroscopic ink of the present disclosure to perform fabric inkjet coating, inkjet finishing, precision coating, surface modification, surface and interior differentiation treatments, and so on.

The sprayable and hygroscopic ink of the present disclosure mainly includes a colorant, a hygroscopic agent, a surfactant, and a solvent. A viscosity of the sprayable and hygroscopic ink is between 1.9 cP and 10.0 cP, such that the ink droplets can be sprayed with a suitable size, and the ink can have suitable fluidity to facilitate the digital printing process. In addition, a surface tension of the sprayable and hygroscopic ink is between 20 mN/m and 37 mN/m, which facilitates the formation of the ink droplets at the nozzle and provides the ink droplets with good permeability. Furthermore, a particle size (D90) of the dispersant in the sprayable hygroscopic ink is between 180 nm and 220 nm, such that the problem of nozzle clogging during the digital printing process can be avoided, and the ink can be provided with good stability and color developing ability. The particle size (D90) of the aforementioned dispersant will also affect the viscosity of the ink. For example, a smaller dispersant particle size in sprayable and hygroscopic ink can provide the ink with a lower viscosity. In addition, the sprayable and hygroscopic ink has a pH value between 6.0 and 8.5 at 25° C., so as to avoid corrosion of the nozzle of the printing device, and prevent the ink from depositing at the nozzle and lead to nozzle clogging.

In the sprayable and hygroscopic ink of the present disclosure, the colorant may be a dispersive dye, a high-temperature dispersive dye, a reactive dye, or an acid dye. In addition, based on 100.0 parts by weight of the sprayable and hygroscopic ink, a content of the colorant is 3.0 parts by weight to 6.0 parts by weight. Within such a content range, the fabric to be printed (sprayed) can present a suitable color concentration, and the uneven color on the fabric or the waste of colorant caused by the excessive colorant which is unable to be absorbed by the fabric can be prevented. In addition, a particle size (D90) of the colorant in the sprayable and hygroscopic ink is between 195 nm and 255 nm. Within such a particle size range, the colorant can effectively infiltrate into the fabric to be printed (sprayed), thereby improving the color fastness of the fabric. For example, when the particle size (D90) of the colorant is larger than 255 m, the dimension of the colorant is larger than the dimension of the pores in the fabric, and hence instead of effectively infiltrating into the fabric, the colorant is attached onto the surface of the fabric. As a result, the colorant and other functional coatings (e.g., the hygroscopic agent) attached onto the surface of the fabric may compete with each other for spaces, making the quality of the fabric unstable.

In the sprayable and hygroscopic ink of the present disclosure, the hygroscopic agent includes a polyetherester, and the polyetherester may be, for example, polyetherester SRT (product name, manufactured by Sino-Japan Chemical Co., LTD.). In addition, a weight-average molecular weight of the polyetherester is between 3000 and 20000, and may be 16000, for example. Within this molecular weight range, the ink can be provided with a suitable viscosity, and the hygroscopic agent can be ensured to be attached onto the surface of the fabric to be printed (sprayed), thereby achieving a good hygroscopic property. For example, when the weight-average molecular weight of the polyetherester is greater than 20,000, the viscosity of the ink may be too high, which causes the ink droplets to aggregate easily, resulting in the problem of nozzle clogging; and when the weight-average molecular weight of the polyetherester is less than 3000, the particle size of the hygroscopic agent is too small, making it easy for the hygroscopic agent to infiltrate into the fabric, such that the hygroscopic agent fails to be attached onto the surface of the fabric to achieve a hygroscopic effect. In some embodiments of the present disclosure, a particle size (D90) of the hygroscopic agent is between 235 nm and 285 nm. In addition, based on 100.0 parts by weight of the sprayable and hygroscopic ink, a content of the hygroscopic agent is 0.5 parts by weight to 2.0 parts by weight. Within such a content range, the hygroscopic agent can effectively absorb moisture and maintain the surface tension of the sprayable and hygroscopic ink. For example, when the hygroscopic agent is included in the sprayable and hygroscopic ink with the above content range, after the ink is sprayed onto the fabric to form functional patterns, the fabric can effectively absorb the sweat discharged from the user's skin, and provide the user with cool and comfortable feelings after the sweat evaporates. When the content of hygroscopic agent is less than 0.5 parts by weight, the sprayable and hygroscopic ink cannot have a good hygroscopic property; and when the content of hygroscopic agent is greater than 2.0 parts by weight, the surface tension of the sprayable and hygroscopic ink may decrease, such that the degree of diffusion of the hygroscopic ink is difficult to control, which may easily cause excessive diffusion of the functional patterns and destroy the original pattern design. In addition, a pH value of the hygroscopic agent at 25° C. is between 6.0 and 8.5. Within this pH value range, the hygroscopic agent will not affect the overall pH value of the sprayable and hygroscopic ink, so as to prevent the ink from corroding the nozzle of the printing device.

In the sprayable and hygroscopic ink of the present disclosure, the surfactant may be, for example, acetylene glycol ethoxylates, silicon-containing surfactants, or combinations thereof. Based on 100.0 parts by weight of the sprayable and hygroscopic ink, a content of the surfactant is 0.5 parts by weight to 1.0 parts by weight. Within such a content range, the surfactant can maintain the size of the particles (such as the colorant, the hygroscopic agent, etc.) in the ink. For example, when the content of the surfactant is less than 0.5 parts by weight, the dispersant in the ink cannot be completely dispersed, and precipitates or agglomerates may be generated; and when the content of the surfactant is greater than 1.0 part by weight, the aggregation between the dispersed substances will be lost due to the repulsive force generated by the excessive surfactant.

In the sprayable and hygroscopic ink of the present disclosure, a moisturizer may also be included. The moisturizer may be, for example, glycerin, ethylene glycol, polyethylene glycol (with a molecular weight of 200, 400, or 600), triethylene glycol, or combinations thereof. Based on 100.0 parts by weight of the sprayable and hygroscopic ink, a content of the moisturizer is 5.0 parts by weight to 20.0 parts by weight. Within such a content range, the sprayable and hygroscopic ink can be prevented from deposition due to agglomeration or nozzle clogging during the printing process. For example, when the content of the moisturizer is less than 5.0 parts by weight, the agglomeration of the sprayable and hygroscopic ink may not be effectively prevented; and when the content of the moisturizer is greater than 20.0 parts by weight, the drying speed of the ink on the fabric is likely to be too slow, which reduces the overall production speed of the digital printing process.

In the sprayable and hygroscopic ink of the present disclosure, a pH regulator may also be included. The pH regulator may be, for example, triethanolamine, sodium dihydrogen phosphate, or combinations thereof. Based on 100.0 parts by weight of the sprayable and hygroscopic ink, a content of the pH regulator is 0.01 parts by weight to 0.2 parts by weight. Within such a content range, the pH value of the sprayable and hygroscopic ink can be ensured to be between 6.0 and 8.5. For example, when the content of the pH regulator is less than 0.01 parts by weight, the pH value of the sprayable and hygroscopic ink may not be effectively maintain between 6.0 and 8.5; and when the content of the pH regulator is greater than 0.2 parts by weight, the sprayable hygroscopic ink is likely to be acidic or alkaline, which will affect the solubility of the ingredients in the ink, and hence precipitates are easily formed, resulting in nozzle clogging or nozzle corrosion.

In the sprayable and hygroscopic ink of the present disclosure, a dispersant may also be included. The dispersant may be, for example, a naphthalenesulfonic acid formaldehyde condensate, a water-soluble polymer compound, a lignin sulfonate, a phenol-formaldehyde condensate sulfonate, a nitrogen-containing heterocyclic ring, a nonionic surfactant, or combinations thereof. Based on 100.0 parts by weight of the sprayable and hygroscopic ink, a content of the dispersant is 2.0 parts by weight to 3.0 parts by weight. Within such a content range, the dispersant in the ink can be ensured to be completely dispersed. For example, when the content of the dispersant is less than 2.0 parts by weight, the dispersant in the ink may agglomerate, thereby generating precipitates or agglomerates and clogging the nozzle.

In the sprayable hygroscopic ink of the present disclosure, a thickening agent may also be included. The thickening agent may be, for example, a sodium alginate, a nitrogen-containing heterocyclic ring, a carboxymethyl cellulose (CMC), or combinations thereof. Based on 100.0 parts by weight of the sprayable and hygroscopic ink, a content of the thickening agent is 1.0 parts by weight to 8.0 parts by weight. Within such a content range, the sprayable and hygroscopic ink has a suitable viscosity. For example, when the content of the thickening agent is less than 1.0 parts by weight, the viscosity of the sprayable and hygroscopic ink may be too low, which makes it difficult to effectively control the fluidity and diffusion of the ink; and when the content of the thickening agent is greater than 8.0 parts by weight, the viscosity of the sprayable and hygroscopic ink may be too high, making it difficult for the ink to be ejected smoothly by the inkjet device, and further causes the problem of nozzle clogging.

The sprayable hygroscopic ink of the present disclosure may also include a defoamer. The defoamer may be, for example, a silicon-containing defoamer. Based on 100.0 parts by weight of the sprayable and hygroscopic ink, a content of the defoamer is 0.01 parts by weight to 0.1 parts by weight. Within such a content range, it can be ensured that there is no foam in the sprayable and hygroscopic ink. For example, when the content of the defoamer is less than 0.01 parts by weight, foam may be easily generated due to the alkaline ingredients in the sprayable and hygroscopic ink, thereby affecting the stability of the ink and the smoothness during printing; and when the content of the agent is greater than 0.1 parts by weight, the viscosity and the surface tension of the sprayable and hygroscopic ink may be too low, thereby affecting the overall properties of the ink.

In the sprayable and hygroscopic ink of the present disclosure, the solvent may be, for example, deionized water, but the present disclosure is not limited in this regard.

FIG. 1 is a schematic side view illustrating a polyester base cloth 110 being sprayed by the sprayable and hygroscopic ink 200 according to some embodiments of the present disclosure. The polyester base cloth 110 has a first surface 111 and a second surface 113 facing away from the first surface 111. When the sprayable and hygroscopic ink 200 is sprayed onto the first surface 111 of the polyester base cloth 110 by a printing device, the ingredients in the sprayable hygroscopic ink 200 will first stay on the first surface 111 of the polyester base cloth 110. Subsequently, the ingredients in the sprayable and hygroscopic ink 200 gradually move to different positions of the polyester base cloth 110 due to their differences in physical properties (e.g., particle size) to form the hygroscopic fabric 100 shown in FIG. 2.

Figure 2:
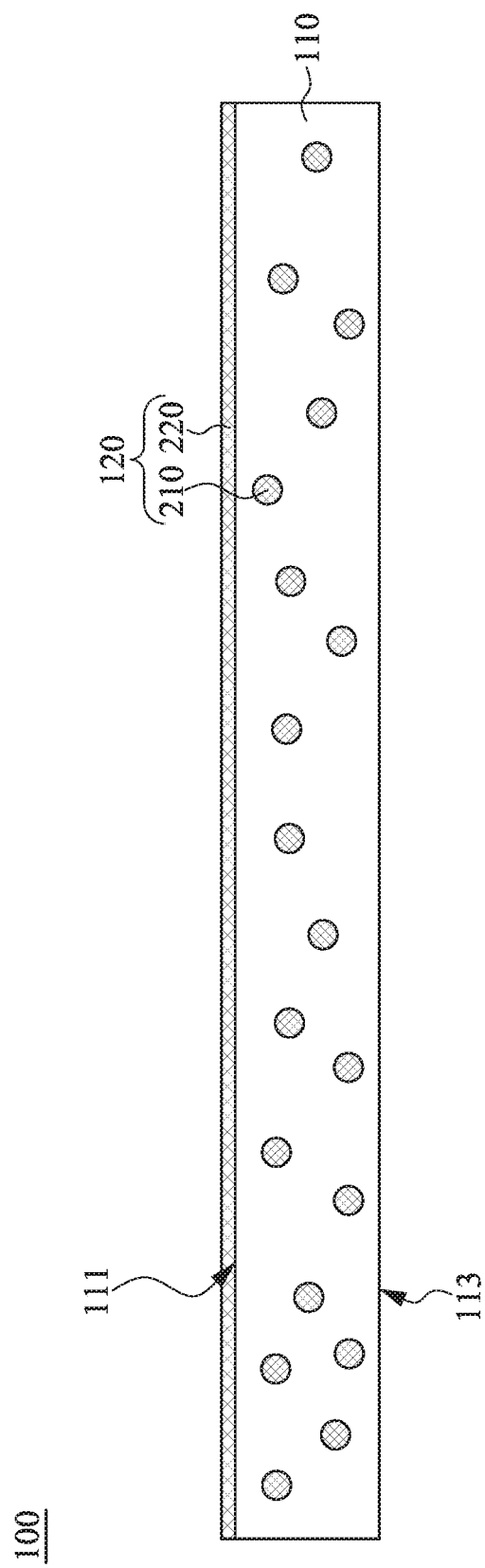
FIG. 2 is a schematic side view illustrating a hygroscopic fabric according to some embodiments of the present disclosure.

FIG. 2 is a schematic side view illustrating a hygroscopic fabric 100 according to some embodiments of the present disclosure. The hygroscopic fabric 100 includes a polyester base cloth 110 and a functional coating layer 120. The functional coating layer 120 is formed by spraying the aforementioned sprayable and hygroscopic ink 200 onto the first surface 111 of the polyester base cloth 110 by the digital printing process. As mentioned above, the colorant 210 in the sprayable and hygroscopic ink 200 infiltrates into the polyester base cloth 110 due to its small particle size, while the hygroscopic agent 220 in the sprayable and hygroscopic ink 200 is disposed on the first surface 111 of the polyester base cloth 110 due to its larger particle size (larger molecular weight). Accordingly, when moisture is attached onto the first surface 111 of the hygroscopic fabric 100, the hygroscopic agent 220 on the first surface 111 can quickly absorb the moisture and guide it to the second surface 113 of the hygroscopic fabric 100, such that the moisture can quickly evaporate from the second surface 113 of the hygroscopic fabric 100. In some embodiments of the present disclosure, the hygroscopic fabric 100 can be applied to unidirectional moisture guiding clothing. For example, the hygroscopic fabric 100 can be made into a textile that can absorb and conduct moisture and have air permeability, and the textile may be, for example, sportswear, casual wear, home wear, and other products.

According to the aforementioned embodiments of the present disclosure, by adjusting each of the ingredients in the sprayable and hygroscopic ink, the sprayable and hygroscopic ink can provide color while having a hygroscopic property. Since the colorant in the sprayable and hygroscopic ink infiltrates into the polyester base cloth after the sprayable and hygroscopic ink is sprayed onto the polyester base cloth, the color fastness of the hygroscopic fabric can be improved; and since the hygroscopic agent is attached onto the surface of the polyester base cloth, the hygroscopic fabric can achieve the effect of adsorbing moisture. In addition, since the colorant and the hygroscopic agent in the sprayable and hygroscopic ink are respectively arranged on different positions of the hygroscopic fabric, there will be no positional competition between the colorant and the hygroscopic agent, such that the hygroscopic fabric can have a stable quality. Furthermore, compared with the dyeing process of the traditional secondary processing, the digital printing process can provide the fabric with partial or overall color and function (e.g., the hygroscopic property) by direct printing (spraying) in a single processing, thereby providing the fabric with both aesthetic and functionality. As such, the steps of the process can be reduced, and the problem of color fastness reduction caused by the migration of colorants during the traditional secondary processing can be solved. In addition, through precise printing (spraying), excessive use of chemical agents can be avoided to reduce waste and effectively reduce costs.

In the following descriptions, various tests and evaluations will be performed on the sprayable and hygroscopic ink and the hygroscopic fabric of the present disclosure.

Experiment 1: Evaluation on the Basic Ingredients of the Sprayable and Hygroscopic Ink The ingredients of the sprayable and hygroscopic inks of embodiments 1 to 4 are shown in Table 1. In each embodiment, the colorant is dispersive dye, the hygroscopic agent is polyetherester SRT (product name, provided by Sino-Japan Chemical Co., LTD.), the dispersant is Solsperse W100 (product name, provided by Lubrizol Corporation), the moisturizer is glycerin and/or triethylene glycol (provided by Emperor Chemical Co., Ltd.), the surfactant is Surfynol 465 (product name, provided by Air Products and Chemicals, Inc.) and BYK348 (product name, provided by Cabot Corporation), the pH regulator is triethanolamine (provided by Emperor Chemical Co., Ltd.), and the thickening agent is polyvinylpyrrolidone (provided by Emperor Chemical Co., Ltd.).

TABLE 1

|  | embodiment 1 | embodiment 2 | embodiment 3 | embodiment 4 |
| --- | --- | --- | --- | --- |
| colorant | 5 | 5 | 5 | 5 |
| hygroscopic agent | 1-3 | 1-3 | 1-3 | 1-3 |
| dispersant | 2 | 2 | 2.5 | 3 |
| moisturizer | 10 | 20 | 10 | 10 |
| surfactant | 0.5 | 0.7 | 0.5 | 0.5 |
| pH regulator | — | — | 4 | 8 |
| thickening agent | 0.1 | 0.1 | — | — |
| deionized water | 79.4-81.4 | 69.2-71.2 | 75.0-77.0 | 70.5-72.5 |
| viscosity (cP) | 1.9-2.3 | 3.1-4.0 | 4.6-6.1 | 7.6-9.9 |
| surface tension (mN/m) | 31.0-32.0 | 23.5-26.0 | 26.9-33.7 | 35.3-37.0 |
| pH value | 7.13-8.04 | 6.98-8.11 | 6.36-7.14 | 6.14-7.17 |
| testing nozzle | EPSON desktop printer | EPSON desktop printer | EPSON DX5 | StarFire SG1024/LA |

Note:
The unit in Table 1 is part by weight

It can be seen from Table 1 that each of the sprayable and hygroscopic inks of embodiments 1 to 4 have a viscosity between 1.9 cP and 10.0 cP, a surface tension between 20 mN/m to 37 mN/m, and a pH value between 6.0 and 8.5. Therefore, the sprayable and hygroscopic inks of embodiments 1 to 4 have suitable fluidity, and can facilitate the formation of ink droplets and provide the ink droplets with good permeability. In addition, the problems of ink deposition, nozzle clogging, and nozzle corrosion can also be solved.

Experiment 2: Evaluation of Stability on the Sprayable and Hygroscopic Ink

The sprayable and hygroscopic inks of embodiments 5 to 7 are prepared by using the dispersive dyes of different colors as the colorants, in which the colorant of embodiment 5 is Cyan a dispersive dye, the colorant of embodiment 6 is a Magenta dispersive dye, and the colorant of embodiment 7 is a Yellow dispersive dye. In addition, the hygroscopic agent of each embodiment is polyetherester SRT. The sprayable and hygroscopic inks of embodiments 5 to 7 are subjected to an accelerated aging experiment to undergo a stability test. The test method is to store the sprayable and hygroscopic ink at 50° C. for 7 days, and measure the changes of ink viscosity, surface tension, pH value, and dispersant particle size (D90) before and after the experiment, as shown in Table 2.

TABLE 2

| | Experiment 5 | Experiment 6 | Experiment 7 |
|---|---|---|---|
| viscosity (cP) before | 2.28 | 2.09 | 1.96 |
| viscosity (cP) after | 2.39 | 1.96 | 1.97 |
| surface tension (mN/m) before | 31.8 | 31.9 | 31.6 |
| surface tension (mN/m) after | 31.8 | 31.6 | 31.7 |
| pH value before | 7.13 | 8.04 | 7.38 |
| pH value after | 7.04 | 7.93 | 7.23 |
| particle diameter (D90) (nm) before | 211 | 209 | 188 |
| particle diameter (D90) (nm) after | 260 | 229 | 230 |

It can be seen from Table 2 that after the accelerated aging test on the sprayable and hygroscopic inks of embodiments 5 to 7, the ink viscosity, the surface tension, the pH value, and the dispersant particle size (D90) change little, and hence the inks are suitable for spraying. It can be seen that the sprayable and hygroscopic ink of each embodiment has good stability and is unlikely to be aging or become maturation.

Experiment 3: Evaluation of Uniformity of Color Difference on the Fabric being Dyed with the Sprayable and Hygroscopic Ink The sprayable and hygroscopic inks of embodiments 5 to 7 are sprayed onto the non-elastic polyester knitted fabrics and the elastic polyester knitted fabrics, and the color differences CMCΔE after spraying are measured with a data color spectrometer, as shown in Table 3.

TABLE 3

| color difference CMCΔE | embodiment 5 | embodiment 6 | embodiment 7 |
| --- | --- | --- | --- |
| non-elastic polyester knitted fabric | 0.25 | 0.21 | 0.25 |
| elastic polyester knitted fabric | 0.21 | 0.27 | 0.32 |

It can be seen from Table 3 that the color differences CMCΔE of the fabrics after being sprayed with the sprayable and hygroscopic inks of embodiments 5 to 7 are all less than 0.6. Accordingly, the sprayable and hygroscopic ink can be uniformly sprayed onto the fabric through the digital printing process, such that the difference between the color presented in each area of the fabric is small (i.e., there is a small color difference between each area), thus forming a fabric with high color uniformity.

Experimental Example 4: Evaluation of Color Yield and Permeability on the Fabric being Dyed with the Sprayable and Hygroscopic Ink The sprayable and hygroscopic inks of embodiments 5 to 7 are sprayed onto the non-elastic polyester knitted fabrics, and the color yields and the permeability are measured, as shown in Table 4.

TABLE 4

|  | embodiment 5 | embodiment 6 | embodiment 7 |
| --- | --- | --- | --- |
| color yield (%) | 95.20 | 91.97 | 92.14 |
| permeability (%) | 29.40 | 33.72. | 17.38 |

It can be seen from Table 4 that the color yields of the fabrics after being sprayed with the sprayable and hygroscopic inks of embodiments 5 to 7 are between 92% and 96%. Accordingly, the color of the fabrics is not severely faded after washing, indicating that the colorant in the sprayable and hygroscopic inks can be firmly embedded in the fabrics. In addition, the permeability of the fabrics after being sprayed with the sprayable and hygroscopic inks of embodiments 5 to 7 are between 17% and 34%. Within such a permeability range, the surface of the fabric can show appropriate color concentration, thereby providing the fabric with aesthetic. For example, when the permeability is too high, the ink may not be able to stay on the surface of the fabric, such that the color of the ink is difficult to be presented on the surface of the fabric; and when the permeability is too low, the interwoven portions of the fibers in the fabric are not easily infiltrated with the inks due to the overlapping of the fibers, and hence when the fabric is stretched, the undyed areas between the fibers are obvious, making the fabric unsightly.

Experimental Example 5: Evaluation of Hygroscopic Effect on the Fabric being Dyed with the Sprayable and Hygroscopic Ink The sprayable and hygroscopic inks of embodiments 5 to 7 are sprayed onto the non-elastic polyester knitted fabrics, and the hygroscopic effects of the fabrics are measured under method AATCC 195, as shown in Table 5. Comparative example 1 is a non-elastic polyester knitted fabric which is not sprayed with the sprayable and hygroscopic ink.

TABLE 5

|  | embodiment 5 | embodiment 6 | embodiment 7 | comparative example 1 |
| --- | --- | --- | --- | --- |
| Wetting Time-Top/Bottom (sec) | 2 | 2 | 2 | 24 |

It can be seen from Table 5 that the fabrics after being sprayed with the sprayable and hygroscopic inks of embodiments 5 to 7 can quickly absorb moisture and have good hygroscopic properties.

Experimental Example 6: Evaluation of Color Fastness to Laundering on the Fabric being Dyed with the Sprayable and Hygroscopic Ink The sprayable and hygroscopic inks of embodiments 5 to 7 are sprayed onto the non-elastic polyester knitted fabrics, and the color fastness to laundering of the fabrics are measured under method AATCC 612A, as shown in Table 6.

TABLE 6

|  | embodiment 5 | embodiment 6 | embodiment 7 |
| --- | --- | --- | --- |
| acetate fiber | 5 grades | 4 grades | 4-5 grades |
| cotton | 5 grades | 5 grades | 5 grades |
| polyester fiber | 5 grades | 4-5 grade | 5 grades |
| acrylic fiber | 5 grades | 5 grades | 5 grades |
| wool | 5 grades | 4-5 grades | 5 grades |

It can be seen from Table 6 that there is almost no color transferred between the hygroscopic fabrics obtained by spraying the sprayable and hygroscopic inks of embodiments 5 to 7 onto the fabric and the followings: acetate fiber, cotton, polyester fiber, acrylic fiber, and wool. That is, the aforementioned hygroscopic fabrics have low pollution levels. Accordingly, the hygroscopic fabrics have good color fastness to laundering.

According to the aforementioned embodiments of the present disclosure, the sprayable and hygroscopic ink has good permeability and stability and suitable fluidity. In addition, the hygroscopic fabric formed by the digital printing process has good color uniformity, color yield, permeability, hygroscopic property, and color fastness to laundering.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A sprayable and hygroscopic ink for a digital printing process on a fabric, comprises:
   3.0 parts by weight to 6.0 parts by weight of a colorant;
   0.5 parts by weight to 2.0 parts by weight of a hygroscopic agent, wherein the hygroscopic agent has a pH value between 6.0 and 8.5 at 25° C.;
   0.5 parts by weight to 1.0 part by weight of a surfactant; and
   a balance of a solvent, wherein a particle diameter (D90) of a dispersant in the sprayable and hygroscopic ink is between 180 nm and 220 nm.

2. The sprayable and hygroscopic ink of claim 1, wherein the hygroscopic agent comprises a polyetherester, and a weight-average molecular weight of the polyetherester is between 3000 and 20000.

3. The sprayable and hygroscopic ink of claim 1, wherein a particle diameter (D90) of the hygroscopic agent is between 235 nm and 285 nm.

4. The sprayable and hygroscopic ink of claim 1, wherein a particle diameter (D90) of the colorant is between 195 nm and 255 nm.

5. The sprayable and hygroscopic ink of claim 1, wherein a viscosity of the sprayable and hygroscopic ink is between 1.9 cP and 10.0 cP.

6. The sprayable and hygroscopic ink of claim 1, wherein a surface tension of the sprayable and hygroscopic ink is between 20 mN/m and 37 mN/m.

7. The sprayable and hygroscopic ink of claim 1, further comprising 1.0 part by weight to 8.0 parts by weight of a thickening agent, and the thickening agent comprises a sodium alginate, a nitrogen-containing heterocyclic ring, a carboxymethyl cellulose (CMC), or combinations thereof.

8. The sprayable and hygroscopic ink of claim 1, further comprising 2.0 parts by weight to 3.0 parts by weight of a dispersant, and the dispersant comprises a naphthalenesulfonic acid formaldehyde condensate, a lignin sulfonate, a phenol-formaldehyde condensate sulfonate, or combinations thereof.

9. The sprayable and hygroscopic ink of claim 1, further comprising a moisturizer, a defoamer, a pH regulator, or combinations thereof.

10. A hygroscopic fabric, comprising:
    a polyester base cloth having a first surface and a second surface facing away from the first surface; and
    a functional coating layer obtained by spraying the sprayable and hygroscopic ink of claim 1 onto the first surface of the polyester base cloth, wherein the colorant of the sprayable and hygroscopic ink infiltrates into the polyester base cloth, and the hygroscopic agent of the sprayable and hygroscopic ink is disposed on the first surface of the polyester base cloth.

* * * * *